July 26, 1960 A. O. SOHN 2,946,281

APPARATUS FOR FEEDING, PRINTING AND CUTTING A STRIP INTO DISCRETE PRINTED PORTIONS

Filed Jan. 12, 1955 4 Sheets-Sheet 1

INVENTOR.
ALLEN O. SOHN
BY
Wheeler, Wheeler & Wheeler
ATTORNEYS

INVENTOR.
ALLEN O. SOHN
BY
Wheeler, Wheeler & Wheeler
ATTORNEYS

July 26, 1960 A. O. SOHN 2,946,281

APPARATUS FOR FEEDING, PRINTING AND CUTTING A STRIP INTO DISCRETE PRINTED PORTIONS

Filed Jan. 12, 1955 4 Sheets-Sheet 3

INVENTOR.
ALLEN O. SOHN
BY
Wheeler, Wheeler & Wheeler
ATTORNEYS

July 26, 1960 A. O. SOHN 2,946,281

APPARATUS FOR FEEDING, PRINTING AND CUTTING A STRIP INTO DISCRETE PRINTED PORTIONS

Filed Jan. 12, 1955 4 Sheets-Sheet 4

INVENTOR.
ALLEN O. SOHN
BY
Wheeler, Wheeler & Wheeler
ATTORNEYS

United States Patent Office 2,946,281
Patented July 26, 1960

2,946,281

APPARATUS FOR FEEDING, PRINTING AND CUTTING A STRIP INTO DISCRETE PRINTED PORTIONS

Allen O. Sohn, 127 Fairview Drive, Plymouth, Wis.

Filed Jan. 12, 1955, Ser. No. 481,374
18 Claims. (Cl. 101—227)

This invention relates to a method and apparatus for feeding, printing and cutting a strip into discrete printed portions.

It is the primary object of the invention to provide a machine which will automatically time itself to feed, print and cut labels or the like from a prefabricated strip. The device of this invention is designed for use with a strip specially prefabricated with gaps partially subdividing the strip into severable portions.

The device of the invention incorporates a novel feed roll which has feeding bosses aligned with said gaps whereby the bosses engage the strip to feed the strip through the machine until the gaps register with the bosses, thus interrupting strip feed after a length of strip equal to one severable portion has passed beneath the roll. The feed roll is also provided with type for printing labels, or the like, on the strip portions between the gaps concurrently with advancement of the strip by the roll. The feed roll also carries a cut-off knife for severing the strip across said gaps and subdividing it into discrete printed labels, etc. for discharge onto a pick-up platform. The platform, or the rolls which feed the severed labels, may be heated to plasticize a thermo-plastic coating on the undersurface of the severed labels thus readying them for immediate use.

The invention further consists in novel control means for starting and stopping the feed roll in a cycle of machine operation which produces a single or predetermined fixed number of severed labels per cycle.

In one embodiment of the invention the control means includes a cycle start lever, proximate the pick-up table, which is engaged by the hand of the person operating the machine in the act of removing a label from the platform. This initiates drive to the feed roll to deliver another label to the platform. The control mechanism further includes means for interrupting drive to the feed roll after delivery of the next label, pending removal thereof and re-actuation of the cycle start lever.

In another embodiment of the invention a one revolution clutch is actuated to rotate the feed roll in its cycle to deliver one label at a time.

The invention further consists in means for maintaining proper tension on the strip and includes a shoe beneath which the strip is fed, the shoe being provided with an ink well and transfer roller adjacent the path of rotation of the feed roll type whereby the type is inked prior to printing.

Some prior art machines have separate feed, printing and cut-off stations. In such machines change of type results in waste of several labels as these must pass through all stations before the label with the desired changed type impression is delivered. In my machine, however, there can be no label waste as there is but a single station. This feature is particularly valuable where a great variety of products are labeled with labels issuing from a single machine and the type is repeatedly changed and reset for this purpose.

The invention further resides in the novel method of feeding, printing and cutting the prefabricated strip into discrete portions, as hereinafter pointed out.

Other objects and advantages of the invention will be more apparent to one skilled in the art upon examination of the following disclosure.

Figure 1:
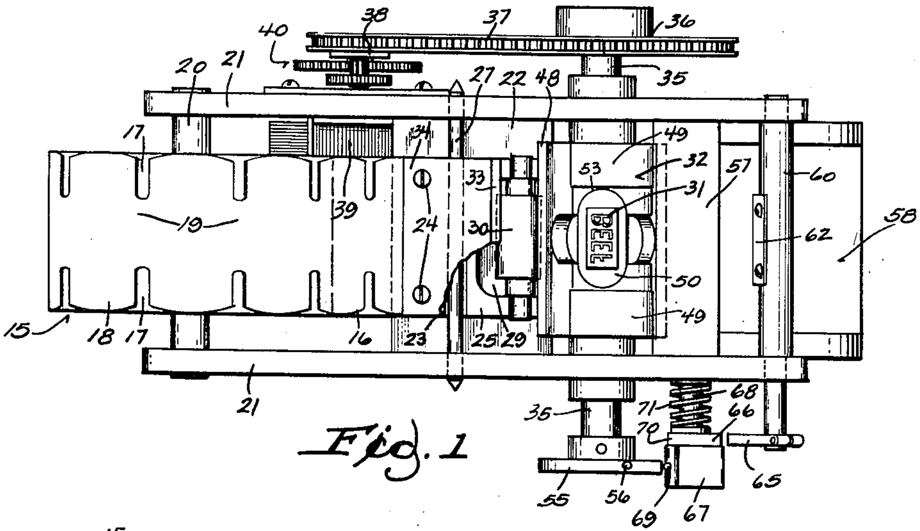
Fig. 1 is a plan view of a device embodying my invention, portions being broken away to disclose details of construction.

The two embodiments of this invention are adapted for use with a roll 15 of strip material 16 which is prefabricated with notches 17 extending inwardly from the side margins of the strip to constitute gaps subdividing the strip into severable label portions 18. The notches do not extend entirely across the width of the strip, webs 19 being left therebetween to connect the respective label portions 18 around the notches.

In the embodiment shown in Figs. 1 through 4 the machine is provided with side frame members 21 which provide a mount for the shaft 20 on which the roll 15 may freely rotate. The strip 16 is threaded from roll 15 between a flat table 22 and a guide shoe 25 above the table. The guide shoe has a curved forward margin 26 to which the strip 16 is tangent. The shoe 25 is mounted on a cross rod 27 received in seat 23 formed in the upper surface of the shoe. One or more compression spring 28 act between the rod and shoe to bias the shoe toward the table.

The portion of the shoe opposite its curved margin 26 is provided with an ink well 29 and with an ink transfer roller 30 rotatably supported in the well for transferring ink to the type 31 mounted on the feed roll 32. A doctor blade 33 is held against the roll 30 by plate 34 mounted by screws 24 to the shoe 25.

The feed roll 32 is mounted on shaft 35 which is journaled in the frame members 21. The shaft is provided at one end with a chain sprocket 36 about which chain 37 passes to a drive sprocket 38 which receives motion from an electric motor 39 driving through a set of reduction gears indicated generally as 40. The motor drives the feed roll in the direction of arrow 44.

A platen comprising a cylindrical steel roller 41 is mounted below feed roll 32 on its shaft 42 journaled for free rotation in the side frame members 21. The shafts 35 and 42 are spaced apart a distance slightly greater than the combined radii of the rolls 32, 41, as best shown in Fig. 2 and Figs. 5–11, so that the intervening strip 16 is not normally clamped between said rolls except when the knife 45, rib 48 or feed bosses 49 on roll 32 come opposite the platen surface to engage the strip against the platen roll 41. As explained herein the knife 45, rib 48 and feed bosses 49 respectively sever the labels, advance the strip 16 and feed the strip 16 through the machine.

Figure 2:
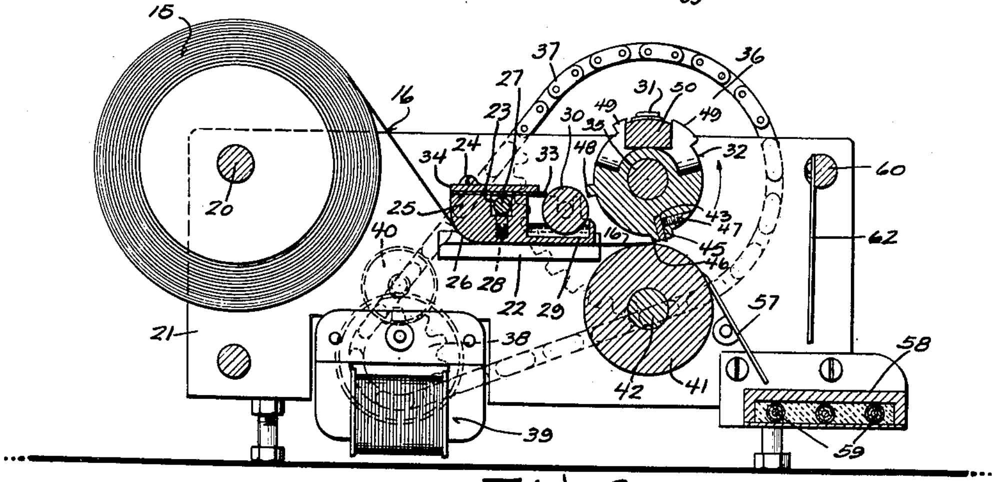
Fig. 2 is a side elevational view, partly in vertical cross section, of the device of Fig. 1.

The cutting knife 45 is mounted radially in a suitable axially extending slot 43 cut in the periphery of the roll 32. The roll margins bordering the slot 43 are outwardly embossed somewhat to constitute a rib 46 reinforcing the knife toward its cutting edge. The knife 45 is adjustably positioned in its slot 43 by means of the set screw 47 (Fig. 2). Following knife 45 in the direction of roll rotation, and arcuately spaced therefrom, is axially extending rib 48. Following rib 48, and arcuately spaced therefrom, are feed bosses 49 of substantial arcuate extent but discontinuous axially to provide space for the type 31 and type bar 50 therebetween. The rib 48 and feed bosses 49 are outwardly embossed from the surface of roll 32 far enough to clamp the strip 16 against the platen roll as shown in Figs. 6–10. Thus the strip 16 is advanced when so engaged by the rib 48 and bosses 49. Strip feed is interrupted, however, between rib 48 and bosses 49 as the radius of the feed roll therebetween is insufficient to engage the strip against the platen roll.

The type bar 50 is provided with spring pressed ball detents 51 (Fig. 4) which frictionally engage the bar within the end walls of a cavity 53 between the bosses 49. The cavity 53 is laterally relieved at 52 at both sides of the type bar 50 to provide finger openings to facilitate manipulation of the bar and its emplacement and removal from the cavity 53. The bar 50 is so disposed within the cavity 53 that the face of type 31 is at the same radius as the feed bosses 49. Accordingly, the type will print the labels concurrently with the feeding thereof by bosses 49. As shown in Fig. 1 the ink transfer roller 30 is aligned between the rotary path of bosses 49 whereby ink is transferred to the type 31 and not to the bosses 49.

Figures 11, 12:
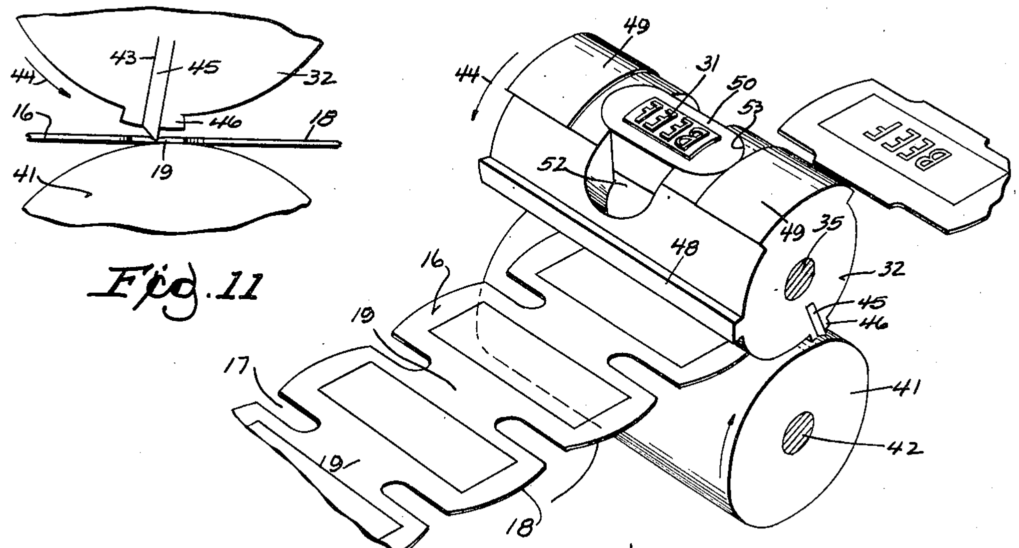
Fig. 12 is a diagrammatic view in perspective showing the feed roll and platen portions of my machine.

As best shown in Fig. 12 the feed bosses 49 are disposed along the path traversed by the gaps or notches 17 in the lateral margins of the strip 16 in the course of label strip advance. Accordingly, as hereinafter explained, the feed bosses will advance the strip while engaging the intervening portions 18 of the strip 16 against the platen roll 41, but will discontinue drive to the strip when the gaps 17 register between the feeding bosses 49 and the platen roll.

The portions 18 of the strip which are severed therefrom by knife 45 are delivered by gravity down an inclined chute 57 (Fig. 2) to a platform 58 which is desirably heated by the electrical resistance units 59. The undersurface of the strip 16 is desirably coated with a thermoplastic adhesive. Accordingly, when the severed labels are disposed upon the heater 58, the coating will be plasticized and ready for instant application to a package.

The control mechanism is as follows:

Above the level of the platform 58, and on a shaft 60 which is journaled in the side frame members 21, is suspended an actuator lever 62 which is bumped by the hand of the operator reaching for the label on the platform 58. The end of the shaft 60 beyond frame element 21 is provided with a striker 65 which is oscillated about shaft 60 when lever 62 is bumped. The striker thus engages a striker follower 66 (Fig. 1) on a switch box 67 to oscillate the switch box about its pivot pin 68 and toward the periphery of a disk 55 which is mounted on the end of feed roll shaft 35 opposite its end to which sprocket 36 is attached. The switch box 67 is provided with a switch button 69 for a micro-switch (not shown). Button 69 is exposed at the side of the box toward the disk 55. When the switch box 67 is oscillated toward the disk 55 the button 69 is depressed upon contact with the smooth periphery of the disk 55. The mounting arm 70 for the box 67 is provided with compression spring 71 about pin 68 which places the mounting arm under substantial frictional bias against the nut 72 on the opposite side of the arm 70 from the spring 71. Thus the switch box 67 will tend to remain in any position to which it is swung about its pin 68.

The leads 75 from the box 67 and micro-switch therein are connected to the motor 39 so that depression of the button 69 will close the switch and initiate action of the motor to drive the feed roll 32. However, when the cam 56 on the periphery of the disk 55 rotates through almost one complete revolution it will engage the button 69 and cam the entire box 67 against the bias of spring 71 and away from the disk. As soon as the cam 56 overruns the button 69, the button 69 will be released to open the switch, disconnect the motor 39 and interrupt drive to the feed roll 32. Further manipulation of the lever 62 above platform 58 is then required to swing the box 67 against the disk 55 to re-start the motor to drive the feed roll in another cycle of operation.

Figure 5:
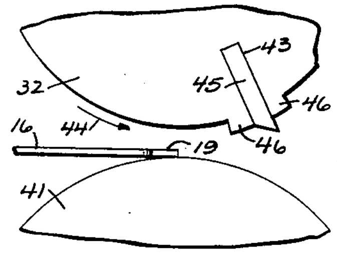
Figs. 5 through 11 are diagrammatic views showing the relative positions of the feed roll and platen as the feed roll is rotated in its feeding, printing and cutting operations.

The novel method and sequence of operations of the device may be best described in connection with the diagrammatic views, Figs. 5 through 11. The position of the feed roll 32 at the conclusion of one cycle of operation in which a portion 18 of the strip is severed and discharged onto platform 58 is shown in Fig. 5. As the knife 45 severs the labels across the web 19, it pulls the strip ahead slightly (1/32″). The only portion of the strip 16 in contact with the platen, however, is the unsevered portion of web 19. When the lever 62 is then actuated by the operator in reaching for the severed label on the platform, the switch button 69 is depressed as hereinbefore explained and drive to the feed roll initiated.

Figure 6:
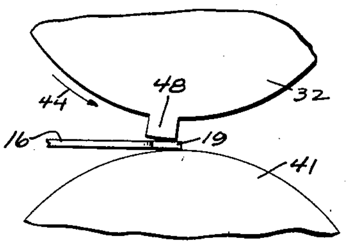
Figure 7:
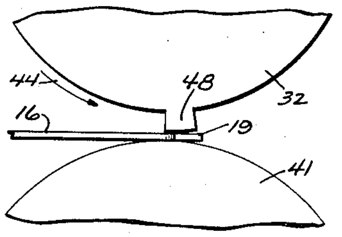

Feed roll 32 then rotates without advancing the strip until the rib 48 engages the unsevered portion of web 19, as shown in Fig. 6. Rotation of the feed roll through the position of the parts shown in Fig. 7 will advance the strip 16 only far enough to contact the marginal portions of the strip bordering the notches 17 with the platen. Thereafter the rib 48 breaks contact with the web 19 to leave the strip in its position shown in Fig. 8. The feed roll again rotates freely without advancing the strip until feed bosses 49 on the roller 32 engage the portions 18 of the strip 16 as in Fig. 8.

Figures 8, 9:
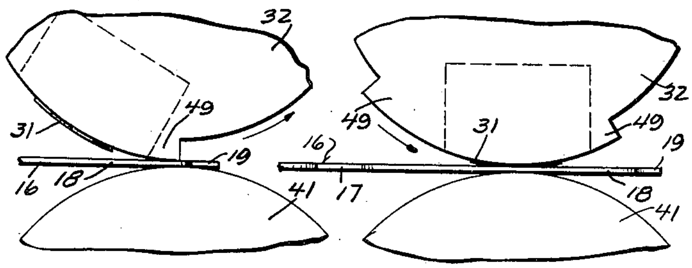
Figure 10:
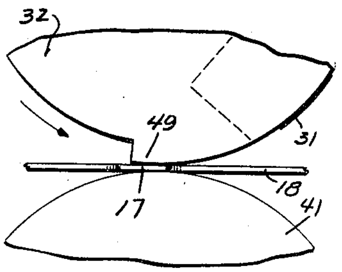

Meanwhile the type 31 has been inked by transfer roller 30. Concurrently with feed of the strip between the feed bosses 49 and platen 41, a label will be printed by type 31 on the portions of the strip axially between the feed bosses 49. As best shown in Fig. 9 the label portions 18 are substantially equal in length to the arcuate extent of the bosses 49. In the position of the parts shown in Fig. 10, when the gaps 17 are brought between the bosses 49 and platen 41, the bosses 49 lose engagement with the labels 18 and strip travel is interrupted. In this position of the parts, web 19 is disposed between the feed roll and the platen 41.

The feed roll continues rotation until the knife 45 severs the web 19, as shown in Fig. 11, and the label 18 is discharged onto platform 48. In this severing action the knife pinches off the strip against the platen 41 (as distinguished from cutting it). After cutting, the parts are left in their Fig. 5 position. The cam 56 disposed on the disk 55 is so positioned thereon to engage the switch button 69 just after the knife 45 has severed the label, thus interrupting drive to the feed roll. The cycle is now completed. The next cycle may be started by operating lever 62 as hereinbefore explained.

From the foregoing description it is clear that the novel structure of the feed roll and the relation between the feed bosses 49 and strip gaps or notches 17 results in the self-timing of the machine whereby the strip is advanced or stopped according to the rotative position of the feed roll. The alignment of the label portions 18 beneath the type 31 is likewise automatic. The point of label severance is fixed, as the strip is fed along its path only until the bosses 49 register with the gaps. The feed of the strip is then discontinued and the knife severs the label from the strip. It is not necessary to prealign the feed roll with the strip as the feed bosses 49 will feed the strip only until the notches 17 register therewith. This establishes the proper relationship between the strip and the feed roll for all succeeding operations.

The embodiment of the invention shown in Figs. 13 through 20 differs from the embodiment shown in Figs. 1 through 4 in details of the ink well, its support on the machine frame, and in the means for adjusting the position of the transfer roller with respect to the type bars mounted in the feed roller. This embodiment of the invention also has a different type of label delivery mechanism including a heating roll for plasticizing the adhesive on the labels. For this embodiment of the invention I also disclose a mechanically actuated single revolution clutch, in place of the switch apparatus shown in Fig. 3 for starting and stopping the feed roll motor.

Figures 13, 14:
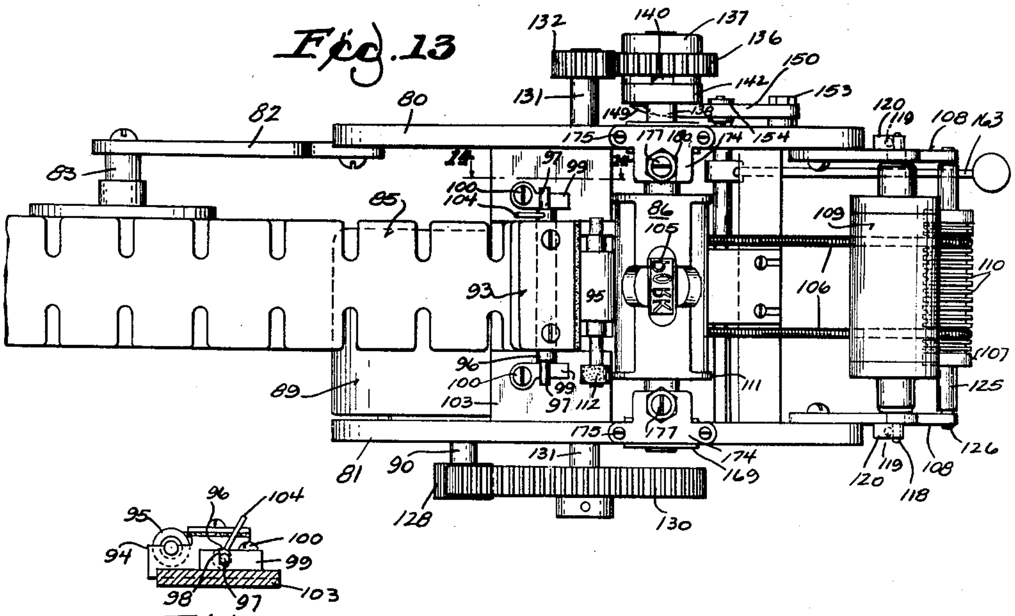
Fig. 13 is a plan view of a modified device embodying my invention.
Fig. 14 is a fragmentary cross sectional view taken along the line 14—14 of Fig. 13.

As best shown in Fig. 13 the device has side frame members 80, 81. A bracket 82 extends rearwardly from side frame 80 and supports on a shaft 83 the drum 84 on which a roll of strip material is mounted to be fed in a web 85 to the feed roller 86 and platen roller 87 for severance by the cut-off knife 88 into discrete label portions.

A motor 89 is mounted between the side frame members 80 and 81 and has an armature shaft 90 extending through a suitable aperture in side frame 81. The gearing from the motor shaft to the feed roll will be described later.

As in the device of the embodiment of Figs. 1 through 4 the web of strip material 85 passes beneath a block 93 having an ink well 94 and a transfer roller 95 mounted therein. In this embodiment of the invention the block 93 is adjustable horizontally toward and away from the periphery of feed roller 86. To this end the block 93 is provided with a cylindrical bore to receive the cylindrical rock shaft 96. Shaft 96 has eccentric end pins 97 engaged in the vertically elongated slots 98 in the stationary bearing blocks 99 mounted by means of the screws 100 to the table 103.

Accordingly, rotation of the rock shaft 96 on its eccentric bearings by means of the crank handle 104 will shift the block 93 horizontally to position the transfer roll 95 for proper pressure against the type face 105 on the feed roll 86. Because the slots 98 are vertically elongated the end pins 97 may move vertically therein so as not to transmit vertical motion to the block.

The feed roll 86 is substantially the same as feed roll 32 of the device of the embodiment of Figs. 1 through 4. It is provided with the cut-off knife 88 and a feed rib 91. It is also desirably provided with end bosses or rings 111. One end ring 111 may drive the feed roller 112 on ink transfer roller 95.

The platen roller 87 is substantially the same as platen roller 41 of the device of Figs. 1 through 4 except that it is in continuous rotation as hereinafter described and is provided with peripheral grooves 105 to receive coil spring belts 106 which have upper runs which extend substantially horizontally to a roller 107 mounted on brackets 108 bolted to the ends of side frame members 80, 81. The belts 106 carry severed labels from the feed roll to a heated roller 109 to plasticize their adhesive. Accordingly, the discharged labels are in readiness for instant application to the ultimate package. The glue is desirably of the type which remains plastic for a substantial period of time after it is heated, thus giving the operator time to remove the label from the machine. The roller 107 desirably is provided with a series of axially spaced alternate ribs and grooves 110 to facilitate picking the label off of the roller.

Figure 16:
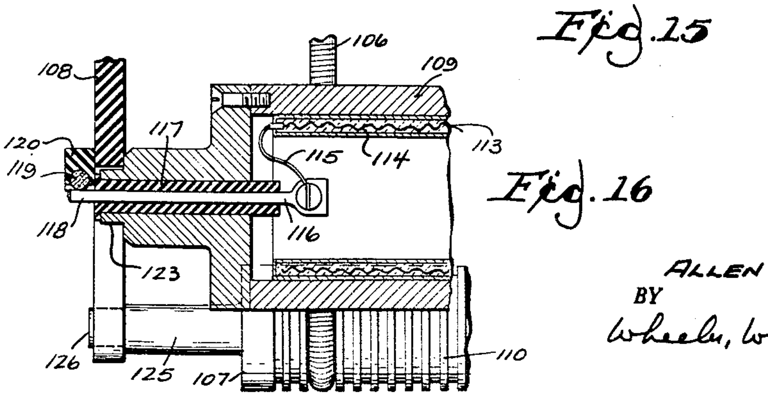
Fig. 16 is a cross sectional view taken along the line 16—16 of Fig. 17.

As best shown in Fig. 16 heat roll 109 may be provided with an internal heating element which may comprise a cylindrical plug or a double walled cylindrical sleeve 113 having resistance wires 114 between the sleeve walls. The wires 114 have leads 115 attached to the terminals of axially extending conductor rods 116 at each end of the roll. The rods 116 are disposed in the bores of insulating tubes 117 but have their ends 118 exposed to bear against the carbon brushes or rods 119 which are mounted for vertical adjustment in the insulated blocks 120 mounted on the outside faces of the brackets 108. As the carbon rod 119 wears it may be vertically shifted to present a new contact area to the rod ends 118.

The hub 123 of roll 109 bears in a horizontal slot 124 formed in the brackets 108. The roll bearings are maintained against the bottom of the slot under pressure of surface contact with the roll 107. The shaft 125 of roll 107 has end bearings 126 which also seat in laterally open slots 127. The tension of spring belts 106 hold roll 107 in its slots and this pressure is transmitted to the periphery of heating roll 109 which is thereby held in its bearing slots with the pin 118 biased into good contact with the carbon rods 119. Slots 127 are deeper than the normal position of shaft 126 to permit limited movement of roll 107 under the bias of the spring belts.

Motor shaft 90 is provided with a pinion 128 which meshes in gear housing 129 with a gear 130 mounted on shaft 131. Shaft 131 extends transversely completely across the device and carries at its opposite end a pinion 132 meshing with gear 135 which in turn meshes with clutch gear 136 which is free to rotate on the extension of shaft 138 of feed roll 86. Gear 135 is mounted on shaft 164 of platen roll 87. Accordingly, the platen roll is constantly rotating, as are the spring belts 106, roller 107 and heating roll 109. Since gears 135 and 136 are the same size, and the rolls 87 and 86 are also the same size, they will uniformly feed the label therebetween when the roll 86 is actuated through the clutch aforesaid.

The clutch gear 136 is laterally confined by collars 137, 142 which are fixed to shaft 138 by set screws 139. Clutch gear 136 is provided with a hub 141 adjacent collar 142 on shaft 138. Hub 141 is provided with a series of lateral openings 140. Hub 141 may be keyed to collar 142 for concurrent rotation by the shiftable key 143 mounted in a way 144 in collar 142. The shaft 138 is provided with a grooved recess 145 and a compression spring 146 therein which biases key 143 toward locking position.

The key 143, however, has a projecting cam follower portion 147 with a beveled face 148 which may engage the correspondingly beveled face 149 of a retractable cam 150. The cam 150 comprises a lever having one end mounted on fixed pintle 153 and having an actuating link 154 pivotally connected thereto on pin 155. A second link 156 (Fig. 18) is pivoted on fixed pintle 157 and has a pivotal connection at 158 with link 154. The two links 154 and 156 constitute a toggle biased by tension spring 159 against stop peg 160 to straighten the toggle and hold the cam 149 in normally raised position (full line position in Fig. 18). In this normal position the cam projects into the path of rotation of the key 143 and cams and holds the key from engagement with the slot in hub 141. In this position of the cam the clutch is disengaged and no power is transmitted to the feed roll 86.

The toggle is actuated from full line position to dotted line position by means of the hand operated lever 163 mounted on pintle 157. (See Fig. 15.) Actuation of lever 163 withdraws the cam 150 from the path of the rotating key and permits spring 146 to project the key into one of the lateral openings 140 in the hub 141 and clutch shaft 137 to shaft 138.

If lever 163 is immediately released to restore cam 150 to position to intercept the key, shaft 138 will make one complete revolution and the key 143 will then re-engage the cam to be withdrawn from engagement with hub 141. Shaft 138 is thus de-clutched from shaft 137.

Figure 3:
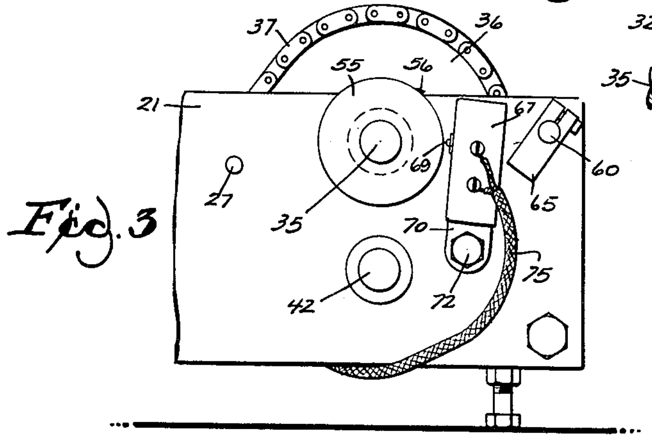
Fig. 3 is an enlarged fragmentary side elevation of the machine of Fig. 1, showing details of the control mechanism.
Figure 4:
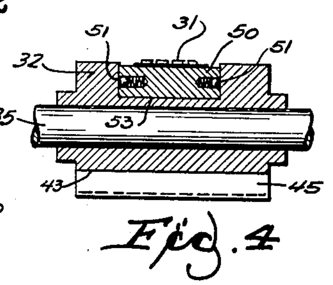
Fig. 4 is an axial cross section taken through the feed roll of my machine.
Figures 17, 18, 19, 20, 21:
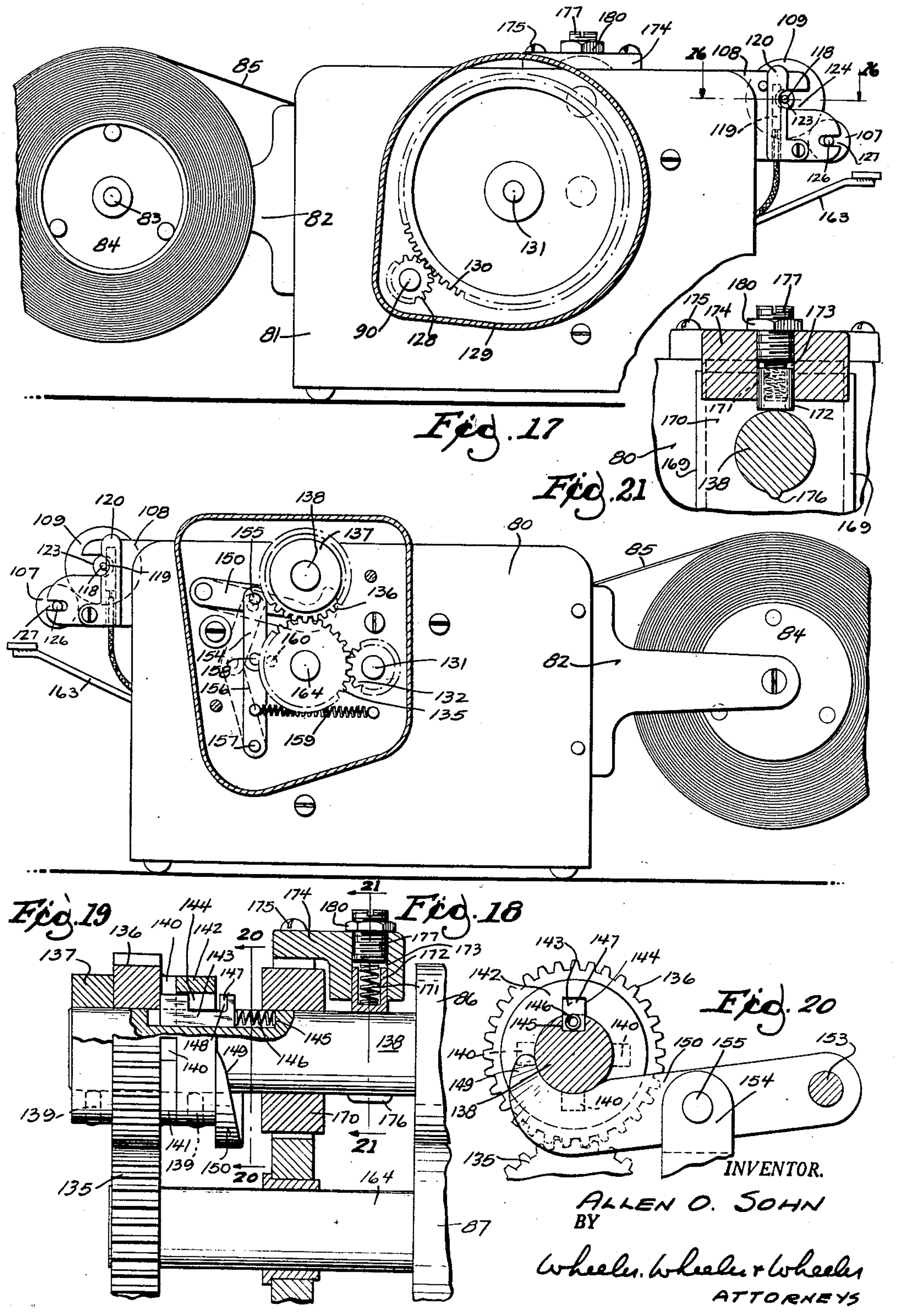
Fig. 17 is a side elevation of the device of Fig. 13, the gear housing being shown in cross section to expose the gear train from the motor to the feed roller.
Fig. 18 is a side elevation of the opposite side of the machine from that shown in Fig. 17, the gear housing being shown in cross section to expose details of the gearing and the clutch between the gear and feed roll.
Fig. 19 is a fragmentary view partly in cross section and partly in elevation of the clutch.
Fig. 20 is a cross sectional view taken along the line 20—20 of Fig. 19.
Fig. 21 is a cross sectional view taken along the line 21—21 of Fig. 19.

From the foregoing it is clear that the device shown in Figs. 17 and 20 is in many respects the mechanical counterpart of the electrical device shown in Fig. 3. In both cases actuation of a manually operated lever produces one complete revolution of the feed roll to feed, print and sever one label from the label strip.

As best shown in Figs. 13, 19 and 21, the shaft 138 of the roll 86 is mounted in bearing blocks 170 having flanges 169 which embrace the edges of the frame members which define ways for the blocks. These blocks are free to move vertically in their ways except as they are restrained from moving downwardly by contact of roll 86 against platen 87 and are restrained from moving upwardly by the compression of springs 171. Springs 171 are mounted in anvil cups 172 which may reciprocate in vertical sockets 173 in brackets 174 which are rigidly mounted by bolts 175 on the upper edges of the frame members 80, 81 at the sides of the way.

Shaft 138 is provided with cams 176 180° arcuately displaced from the cut-off knife 88 and aligned with the respective spring pressed cups 172. Cups 172 are retractable into their sockets 173 under pressure of the cams 176 and will bottom against adjustable screws 177 to firmly hold the roll 86 against upward movement while the knife is severing the paper. Lock nuts 180 holds screws 177 in adjusted position.

In this manner the roll 86 is impositively held under compression of springs 171 against the platen 87 and intervening web 85, and may yield upwardly to accommodate for variations in web thickness, except during the severing step when cams 176 bottom cups 172 against screws 177 and the roll and knife are rigidly held to force the knife through the paper web.

Figure 15:
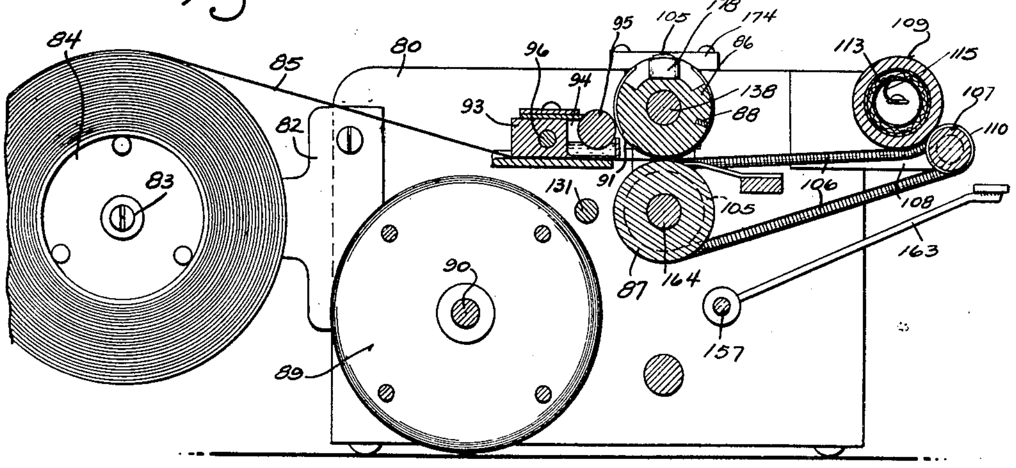
Fig. 15 is a fragmentary side elevational view, partly in cross section, of the device of Fig. 13.

The type bar 105 is desirably seated in rubber 178 or spring mounted in roll 86. As shown in Fig. 15 the face of the type is desirably slightly radially offset (about .01 inch) from the surfaces of the feed bosses on the roll. Accordingly, the type will retract slightly against the bias of its resilient mounting 178 when imprinting the web and will be biased both by its resilient mounting 178 and the springs 171 against the paper to assure a sharp and clear impression on the web.

The specific roll mounting, cam arrangement, etc., just described, may also be used in the embodiment of the invention shown in Figs. 1–12. Where frame mounting elements are inherently resilient the feed bosses and ribs will normally be biased toward the platen roll for positive clamping of the web therebetween. In an otherwise rigid machine, however, the bias springs 171 are used to insure positive engagement of the feed parts. As shown in Fig. 19 the springs 171 are set to engage the feed bosses and ribs with the platen roll and permit the feed roll to yield upwardly when a web of label stock passes between the rolls.

Various features of the invention may be used individually. The use of the printing feature, for example, is optional. The feed mechanism can be used alone or in combination with control mechanism other than that shown. The control mechanism is useful apart from the specific feed, and is applicable anywhere discharge of a single item on actuation of a control lever is desired.

I claim:

1. A machine for feeding a strip, severing portions from the strip, and delivering the severed portions, said machine comprising a feed roller, means on said roller for feeding said strip, means on said roller for severing said strip into portions, means to deliver said severed portions, a motor, means for driving said feed roll from said motor, and a drive control for turning said roll, an actuator for said control, said drive control comprising a switch having a button, motion transmitting connections from the switch to the actuator whereby said actuator may operate said button to initiate drive, a cam driven by said feed roll, said button being in the path of the cam whereby the cam may operate said button to de-actuate said switch and drive, said switch being provided with a pivotal mounting on which it is bodily swingable, said mounting including biasing means whereby said switch will remain in any position to which it is swung subject to a dislocating force sufficient to overcome said bias, a rotor driven by said feed roll, said rotor being disposed in the path of swinging movement of the switch, said rotor having a smooth surface, said cam comprising a projection from said surface, said actuator comprising means for bodily swinging the switch on its pivotal mounting against the bias of said biasing means to depress said button against the smooth surface of said rotor to initiate drive, said bias being sufficient to hold the button depressed against said smooth surface when the actuator is retracted during rotation of said rotor until said cam engages said switch to bodily swing it away from said rotor to release said button and deactuate said drive.

2. A machine for feeding a strip prefabricated with lateral notches sub-dividing said strip into severable portions and having webs connecting said portions between said notches and comprising a mechanism for feeding said strip, severing portions from said strip and delivering said portions, said mechanism comprising a platen and a feed roll which cooperates with said platen for feeding said strip therebetween, said feed roll comprising a cylinder having in arcuately spaced relation about its periphery a knife to sever said webs between said strip portions, a rib to engage the strip to advance said strip at least partially across said platen, and a feed boss aligned with the path of travel of the notches in the strip whereby to feed said strip when strip portions between said notches are between said feed boss and platen and discontinue feeding said strip when said notches are disposed between said feed boss and said platen, a motor driving said feed roller, and a drive control including an actuator and means for rotating said feed roll through one complete revolution every time the actuator is actuated.

3. A feeding device for a prefabricated strip having partial gaps defining along the strip a plurality of severable portions, said strip having webs extending past the gaps and connecting said portions, said device comprising a platen and a feed roll between which said strip is fed, said feed roll being provided with a boss which engages between said boss and platen only the portions of said strip between said gaps whereby to advance said strip, said boss being aligned in the course of strip travel with said gaps whereby registry of the gaps between the boss and platen will disengage the roll from the strip to discontinue feeding motion thereof, said feed roll being further provided with a cutting knife engageable with said web to sever said strip into discrete portions, and a rib arcuately spaced about the periphery of the roll from said knife whereby to engage an unsevered portion of the web to advance the strip across the platen until the leading margin of the next succeeding strip portion engages the platen for engagement by said boss.

4. The device of claim 3 in which said gaps comprise notches inwardly extending from the lateral margins of the strip at both sides thereof, said webs being disposed between said notches, said boss being axially discontinuous across said web to divide the boss into portions aligned with said gaps.

5. The device of claim 4 in which said roll is provided with printing type between said boss portions whereby said strip portions between gaps are printed concurrently with strip feed.

6. In a device of the character described, feeding mechanism for a strip comprising a feed table, a strip guide shoe disposed over said table and spaced therefrom for passage of the strip between the shoe and table, said shoe being biased toward said table for frictional engagement with the strip, a printing roll beyond said shoe and table, said printing roll including type carried thereby for impression on said strip, said shoe being provided with an inkwell and an inking roller in said well for applying ink to the type of the printing roller, said table provided with brackets at each side of said shoe, a rod having eccentric pins at its ends, said shoe having a bearing for the rod and the brackets having a bearing for the pins, one of said bearings being elongated in a direction transverse to said table whereby rotation of said rod will adjust the shoe along the table but will not affect its position transversely thereof.

7. In a device of the character described including means for feeding a strip between a feed roll and platen, means for severing the strip into discrete portions and delivering severed portions to a platform, a drive for rotating said feed roll, control means for automatically controlling said roll for severance of a strip portion and stopping said roll until removal of said severed portion, said means comprising a disk driven by said feed roll, a cam on said disk, a switch having a pivotal mounting and a switch button movable with said switch into the path of said cam, means for biasing said switch on its pivotal mounting against movement thereof, and means adjacent the platform for bodily oscillating the switch toward said disk whereby to close said button against the edge of the disk whereby to initiate drive to said feed roll, rotation of said disk being effective to rotate the cam through approximately one revolution in the course of which it engages said switch to bodily oscillate the switch on its mounting away from said disk to release said button and deactuate the drive.

8. A device of the character described comprising coacting feed and platen rollers, one of said rollers having a cutting knife thereon, a supply of strip material, means for actuating said feed roller to feed said strip and sever a discrete portiont herefrom, a discharge roller spaced from said coacting rollers, a belt between the platen roller and discharge roller, said belt comprising means for conveying severed strip portions from the coacting rollers to the discharge roll, a second discharge roll coacting with the discharge roll first mentioned, one of said rolls having a heating element therein for plasticizing adhesive on said severed strip portions, in combination with discharge roll mounting brackets, said brackets being provided with edge margins and dual slots opening to said margins and elongated in the general direction of conveyor movement, said discharge rolls having shafts in said slots, the shaft of the second discharge roll having a bearing in the bottom of its slots and the shaft of the discharge roll first mentioned being free for movement in its slots, said discharge rolls having their roll surfaces in peripheral contact, the pressure of said conveyor belt on said discharge belt first mentioned biasing said second discharge roll against its bearing.

9. The device of claim 8 in which said heating element is in said second discharge roll, said heating element being provided with axially extending electric contact elements, said brackets being provided with electric contact elements against which the heating roll contact elements are biased by the tension of said conveyor belt.

10. In a device of the character described, the subcombination of a feed roll for advancing, printing and severing a continuous web into discrete particles, said roll comprising a cylinder having in arcuately spaced relation separate members comprising a longitudinal timing rib for advancing the web, typing means for printing the web, a feed boss at the side of the typing means for advancing the web concurrent with imprinting thereof, and a cut-off knife for severing the web beyond the imprint made by the type.

11. The device of claim 10 in which said roll is provided with a resilient mount for said typing means, said typing means having a type face extending radially beyond the surface of the feed boss, said type means being retractable against the bias of said resilient mount to dispose its face flush with the surface of the feed boss during imprinting.

12. In a device of the character described, the combination with a shaft and a cut-off knife mounted on the shaft for rotation therewith, a platen, means for passing a web of severable sheet material between said platen and knife, of a mounting for said shaft, said mounting comprising means on which said shaft is free to move away from the platen, and means for restraining such movement of the shaft during coaction of the knife with the platen for severing the web.

13. The device of claim 12 in which the means last mentioned comprises a cam on the shaft and a thrust abutment engaged by the cam in that portion of the arc of shaft rotation during which the knife coacts with the platen.

14. The device of claim 13 in which the thrust abutment comprises a spring pressed anvil normally bearing on the shaft, said anvil having a mounting including an anvil seat against which the anvil retracts against the bias of the spring when engaged by the cam.

15. The device of claim 14 in which the anvil seat comprises a screw adjustable with respect to the axis of anvil retraction.

16. In a device of the character described, the combination with web feeding and platen rolls, said feeding roll having a cut-off knife, frame members in which said rolls are mounted, a mounting for one of said rolls including bearing blocks, said frame members having ways in which said blocks are slidable for separation of said rolls, said frame members being further provided with means for resiliently biasing said rolls together and against which said one roll may yield, and means for immobilizing said resilient means when the cut-off knife coacts with the platen roll.

17. The device of claim 16 in which said one roll has a shaft, said frame members being provided with brackets having sockets facing said shaft, thrust caps retractable in said sockets and springs between the thrust seats and thrust caps to bias said caps toward the shaft whereby said springs provide impositive means for holding the rolls together, and cams on the shaft aligned with said thrust caps to retract said caps against said seats to immobilize the springs and provide a rigid support for the roll when the knife coacts with the platen roll.

18. A machine for feeding a strip prefabricated with lateral notches subdividing said strip into severable portions and having webs connecting said portions between said notches and comprising a mechanism for feeding said strip, severing portions from said strip and delivering said portions, said mechanism comprising a platen and a feed roll which cooperates with said platen for feeding said strip therebetween, said feed roll comprising a cylinder having a knife to sever said webs between said strip portions, a rib to engage the strip to advance said strip at least partially across said platen, and a feed boss aligned with the path of travel of the notches in the strip whereby to feed said strip when strip portions between said notches are between said fed boss and platen and discontinue feeding said strip when said notches are disposed between said feed boss and said platen, a motor driving said feed roller, and a drive control including an actuator and means for rotating said feed roll through one complete revolution every time the actuator is actuated.

(References on following page)

References Cited in the file of this patent

UNITED STATES PATENTS

| | | |
|---|---|---|
| 970,768 | Vaughan | Sept. 20, 1910 |
| 1,437,949 | Sherman et al. | Dec. 5, 1922 |
| 1,497,766 | Balkwill | June 17, 1924 |
| 1,648,549 | Jensen | Nov. 8, 1927 |
| 1,880,111 | Shmyroff et al. | Sept. 27, 1932 |
| 2,041,831 | Helsel | May 26, 1936 |
| 2,046,742 | Helsel | July 7, 1936 |
| 2,097,485 | Helsel | Nov. 2, 1937 |
| 2,125,443 | Helsel | Aug. 2, 1938 |
| 2,150,761 | Craig et al. | Mar. 14, 1939 |
| 2,178,922 | Smith | Nov. 7, 1939 |
| 2,225,529 | Beall | Dec. 17, 1940 |
| 2,235,130 | Webb | Mar. 18, 1941 |
| 2,251,312 | Yoder | Aug. 5, 1941 |
| 2,287,690 | Loverch et al. | June 23, 1942 |
| 2,326,916 | Anderson | Aug. 17, 1943 |
| 2,543,220 | Ardell | Feb. 27, 1951 |
| 2,754,751 | Marsh et al. | July 17, 1956 |